United States Patent
Johnson

(10) Patent No.: US 9,131,296 B2
(45) Date of Patent: Sep. 8, 2015

(54) AUTO-CONFIGURING AUDIO OUTPUT FOR AUDIO PERFORMANCE AND FAULT DETECTION

(75) Inventor: Timothy M. Johnson, San Jose, CA (US)

(73) Assignee: Apple Inc., Cupertino, CA (US)

(*) Notice: Subject to any disclaimer, the term of this patent is extended or adjusted under 35 U.S.C. 154(b) by 945 days.

(21) Appl. No.: 13/236,254

(22) Filed: Sep. 19, 2011

(65) Prior Publication Data

US 2013/0070930 A1 Mar. 21, 2013

(51) Int. Cl.
*H04R 3/00* (2006.01)
*H04R 29/00* (2006.01)
*G06F 11/00* (2006.01)
(Continued)

(52) U.S. Cl.
CPC ............... *H04R 3/007* (2013.01); *H04R 29/00* (2013.01); *G06F 11/00* (2013.01); *H04R 3/04* (2013.01); *H04R 3/12* (2013.01); *H04R 2201/107* (2013.01); *H04R 2420/01* (2013.01); *H04R 2420/03* (2013.01); *H04R 2420/05* (2013.01); *H04R 2420/09* (2013.01); *H04R 2430/01* (2013.01); *H04R 2499/11* (2013.01)

(58) Field of Classification Search
CPC ............ H04R 3/00; H04R 3/007; H04R 3/04; H04R 3/12; H04R 29/00; H04R 2201/107; H04R 2420/01; H04R 2420/03; H04R 2420/05; H04R 2420/09; H04R 2430/01; H04R 2499/11; H04R 5/04; G06F 11/3013; G06F 11/3058; G01R 31/041; G01R 31/043; H03H 11/28
USPC ...................... 381/55, 56–57, 58, 120; 700/94
See application file for complete search history.

(56) References Cited

U.S. PATENT DOCUMENTS

| 5,832,438 A | 11/1998 | Bauer |
| 7,366,577 B2 * | 4/2008 | DiSanza et al. ............... 700/94 |
| 7,579,832 B1 | 8/2009 | Blackburn et al. |

(Continued)

FOREIGN PATENT DOCUMENTS

WO WO-2007078347 A1 7/2007

OTHER PUBLICATIONS

International Preliminary Report on Patentability for corresponding International Application No. PCT/US2012/054671, mailing date Apr. 3, 2014, 13 pages.

(Continued)

*Primary Examiner* — Duc Nguyen
*Assistant Examiner* — Alexander Eljaiek
(74) *Attorney, Agent, or Firm* — Blakely, Sokoloff, Taylor & Zafman LLP

(57) ABSTRACT

An audio system has a connector with a signal pin that interfaces the audio system with an external device. An audio integrated circuit has a digital to analog converter (DAC) and an audio power amplifier having an input coupled to an output of the DAC and an output coupled to an output pin of the audio integrated circuit. Data storage contains stored instructions that program a processor to select an audio output mode of operation namely line-out mode or headphone mode. A configurable output conditioning circuit is coupled between the output pin of the audio integrated circuit and the signal pin of the connector. The conditioning circuit changes the output impedance that is presented at the signal pin, under control of the programmed processor when selecting the audio output mode of operation. Other embodiments are also described and claimed.

16 Claims, 5 Drawing Sheets

(51) Int. Cl.
   *H04R 3/04*      (2006.01)
   *H04R 3/12*      (2006.01)

(56) References Cited

U.S. PATENT DOCUMENTS

| | | | |
|---|---|---|---|
| 7,769,187 B1 | 8/2010 | Farrar et al. | |
| 8,014,539 B2 * | 9/2011 | Song et al. | 381/74 |
| 2004/0081099 A1 * | 4/2004 | Patterson et al. | 370/241 |
| 2007/0223736 A1 * | 9/2007 | Stenmark et al. | 381/103 |
| 2008/0159567 A1 * | 7/2008 | Lesso et al. | 381/120 |
| 2010/0017691 A1 * | 1/2010 | Lin et al. | 714/799 |
| 2011/0095817 A1 * | 4/2011 | Yamada | 330/98 |
| 2011/0128019 A1 * | 6/2011 | Saito | 324/713 |

OTHER PUBLICATIONS

"Low-Power Audio CODEC wit DirectDrive Headphone Amplifiers", MAX9856, Maxim Integrated Products, Product Information, 19-1288; Rev. 1; Sep. 2008, (pp. 1-46).

"Multi-Channel High Definition Audio CODEC", WM8860, Wolfson® Microelectronics, Product Brief, Apr. 2011, Rev. 3.1, (pp. 1-24).

PCT Invitation to Pay Additional Fees (dated Dec. 14, 2012), International Application No. PCT/US2012/054671, International Filing Date—Sep. 11, 2012, (7 pages).

PCT International Search Report and Written Opinion (dated Feb. 22, 2013), International Application No. PCT/US2012/054671, International Filing Date—Sep. 11, 2012, (19 pages).

* cited by examiner

HEADPHONE MODE

LINE OUT MODE

AUTO-CONFIGURING AUDIO OUTPUT FOR AUDIO PERFORMANCE AND FAULT DETECTION

An embodiment of the invention relates to electronic audio systems and automatically configuring output impedance for improved audio performance. Other embodiments are also described.

BACKGROUND

Audio systems such as consumer electronic portable devices including smart phones and digital media players have a headphone or earphone jack through which the portable can interface with an accessory device, such as a directly powered headset. An audio integrated circuit referred to as an audio codec is used within the portable device, to convert digital audio files and digital audio streams into analog form, which is then driven by an audio power amplifier whose output is coupled to a speaker signal pin of the headphone jack. In addition, the audio codec also includes the capability of converting an audio signal from analog into digital form, where the input analog signal can be obtained from an integrated microphone within the headset that is plugged into the headphone jack. The audio codec is typically equipped with several such audio channels, allowing digital audio to be played back through either the earpiece receiver in the case of a smart phone, a speakerphone, or through the headphone jack to external earphones. It has also been suggested that the earphone jack be used to attach the audio system to a standalone device such as a self-powered speaker, a television, or a home theater audio amplifier/receiver.

SUMMARY

An embodiment of the invention is an audio system having a connector with a signal pin that interfaces the audio system with an external device, an audio integrated circuit having a digital-to-analog converter (DAC), an audio power amplifier (having variable gain for setting the volume) with an input coupled to an output of the DAC and an output coupled to an output pin of the audio integrated circuit, and a configurable output conditioning circuit that is coupled between the output pin of the audio integrated circuit and the signal pin of the connector. Under control of a programmed processor that can select an audio output mode of operation, which may be one of line out mode and headphone mode, the conditioning circuit can be configured to change the output impedance that is presented at the signal pin of the connector (to the external device). In addition, the audio integrated circuit may have an analog-to-digital converter (ADC) whose input is coupled to an input pin of the audio integrated circuit. This input pin is coupled to the signal pin of the connector, allowing the programmed processor to read the output of the ADC and thereby measure the voltage on the signal pin. The processor will then analyze the measured voltage to determine the type of load that is present. This may be done by monitoring the voltage that is on the signal pin, which may represent the voltage across the attached load, and comparing this to the digital audio content output that is simultaneously being sent out of the signal pin (by the DAC and the power amplifier).

The programmed processor may be configured to perform a self-test routine for the audio system, to test whether the audio system is capable of properly driving the attached load (by outputting audio through the accessory connector). In one embodiment, the output conditioning circuit includes a passive resistor with a known value, which is series-coupled between the output pin of the audio integrated circuit and the signal pin of the connector. The series resistor enables a measurement of the output current, which together with the measured voltage on the signal pin can be used to determine the impedance characteristics (e.g., short, low, high, and open circuit) of the attached load, and hence the type of load. The series resistor also allows the programmed processor to calculate the output current which can then be compared to an expected or permissible range, in order to decide whether or not the audio system is or is not able to properly drive the attached load.

In another embodiment of the invention, the arrangement above may be used by the programmed processor to determine whether or not a fault condition exists on the signal pin of the connector, and on that basis control the power amplifier and/or signal an alert to a user of the system (e.g., lower the volume or simply disable the power amplifier) if it appears, based on the measured voltage on the signal pin and the current volume setting, that the signal pin is essentially shorted or exhibits too low of an impedance.

The resistor in the output conditioning circuit can be switched in and out under control of the programmed processor, when selecting the audio output mode of operation. For instance, in the line out mode where the load resistance is expected to be "high" and the load capacitance may also be deemed high, the passive resistor is switched in, which increases the output impedance and therefore helps isolate the higher capacitance load; this improves robustness of the power amplifier when it is driving the higher capacitance load. In contrast, in the headphone mode, where the load resistance is expected to be "low" and the load capacitance is also expected to be low, the passive resistor is switched out (i.e., shorted out).

In a further embodiment, the programmed processor reads the output of the ADC of the audio integrated circuit, processes the reading to determine the impedance characteristics on the signal pin, and on that basis adjusts an audio equalization parameter that affects, and in particular shapes, the spectral characteristics of audio content that is being concurrently fed to the DAC. For instance, in line out mode, where the series resistor is switched in, the impedance (over the audio band) that is seen by the power amplifier will likely be affected by shunt parasitic capacitance that is typically present on the signal pin. The programmed processor, however, will be able to automatically adjust the equalization that is being applied to the audio content (e.g., digitally by an audio processing channel "upstream" of the DAC—not shown), in order to compensate for a certain amount of frequency roll off that the RC combination of the shunt parasitic capacitance and the series-coupled resistor may cause. Such a technique may also be useful in the headphone mode of operation, to compensate for any irregular frequency shaping that may exist as a result of varying earphone impedance (between the different types of earphones that may be used).

In yet a further embodiment, a switch is series-coupled between the output of the power amplifier and the signal pin of the connector. Such a switch may be outside the audio integrated circuit, between the output pin of the audio integrated circuit and the signal pin of the connector. In such an arrangement, the processor may be programmed to open the switch when it has selected an analog line-in mode of operation in which the processor is reading the ADC output, in order to process an externally sourced audio signal. Opening the switch will prevent the power amplifier from attenuating the externally sourced audio signal that is being received through the signal pin (and that is being routed to the ADC input for readout by the processor).

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
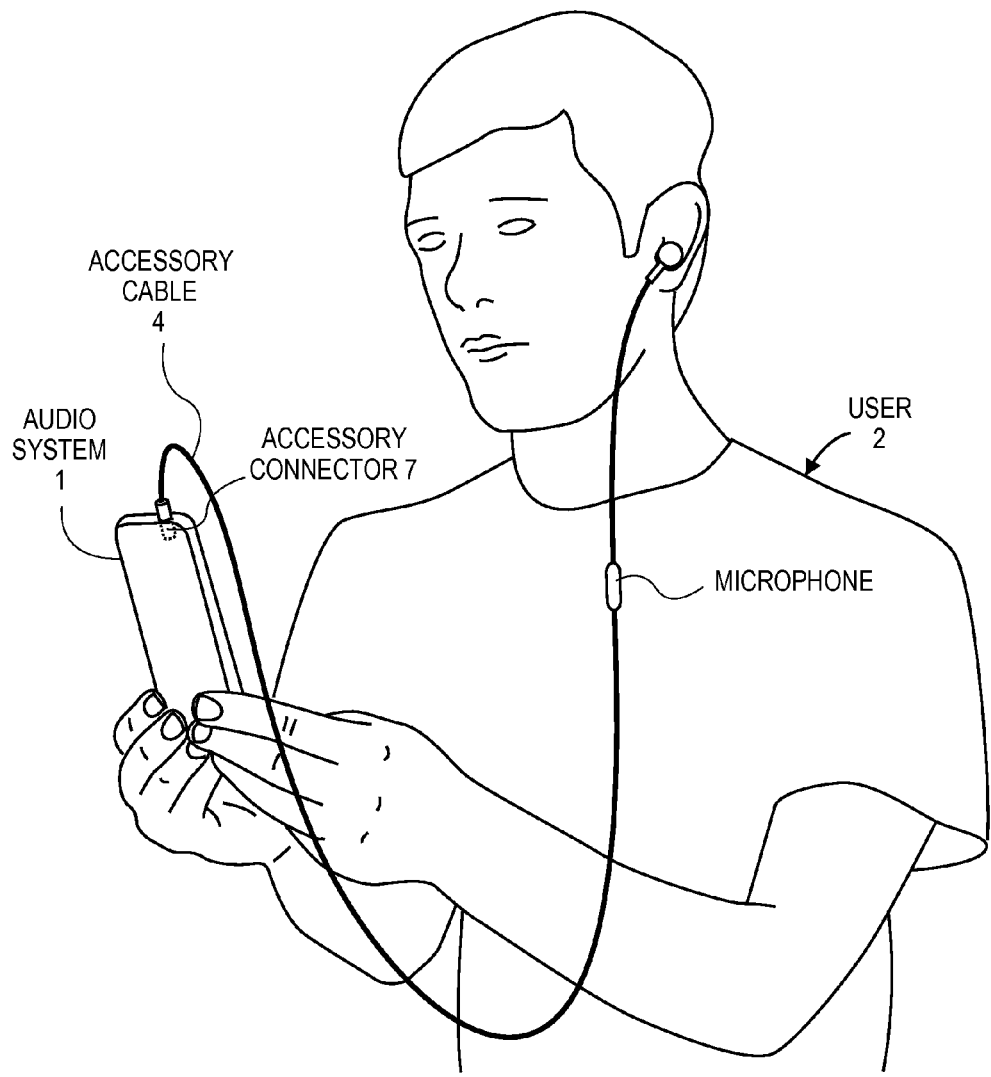
FIG. 1 shows an audio system in use while in the headphone mode.

FIG. 1 shows an audio system 1 in use while in a headphone mode of operation. In this example, the audio system 1 is a portable device that is also handheld, such as a smart phone, a digital media player, or a tablet computer. The audio system 1 has a housing in which an accessory connector 7, e.g. a headphone or earphone jack, is integrated. An accessory cable 4 is connected to the accessory connector 7 at one end, and is terminated at another end by an earphone and by a microphone. The accessory cable 4 can be part of a conventional, wired headset combination. The audio system 1 can be "playing" any digital audio content through the accessory cable 4, including, for instance, a locally stored media file such as a music file or a video file, a media file that is streaming over the Internet, and the downlink speech signal in a two-way real-time communications session, also referred to as a telephone call or a video call. The latter is enabled by the external microphone that is connected to the cable 4, which can be used to pickup the speech of the user 2 during the call.

Figure 2:
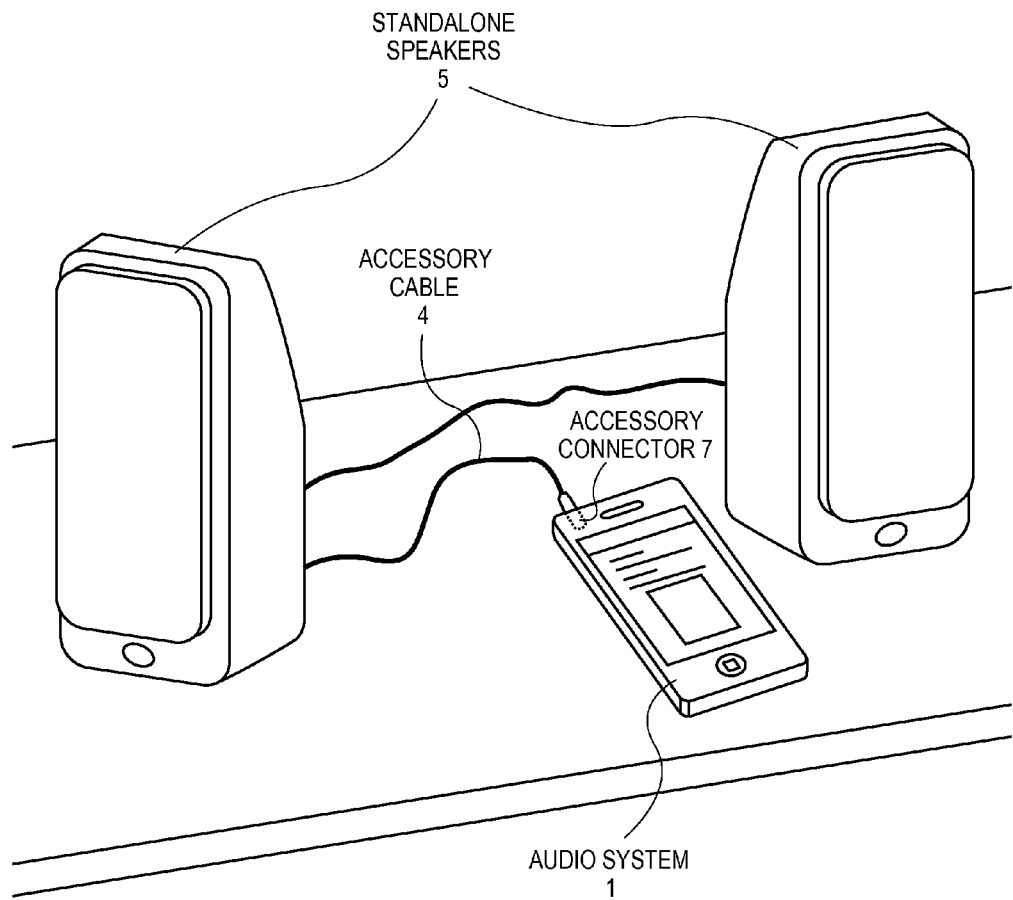
FIG. 2 shows the audio system in use while in the line out mode.
Figure 3:
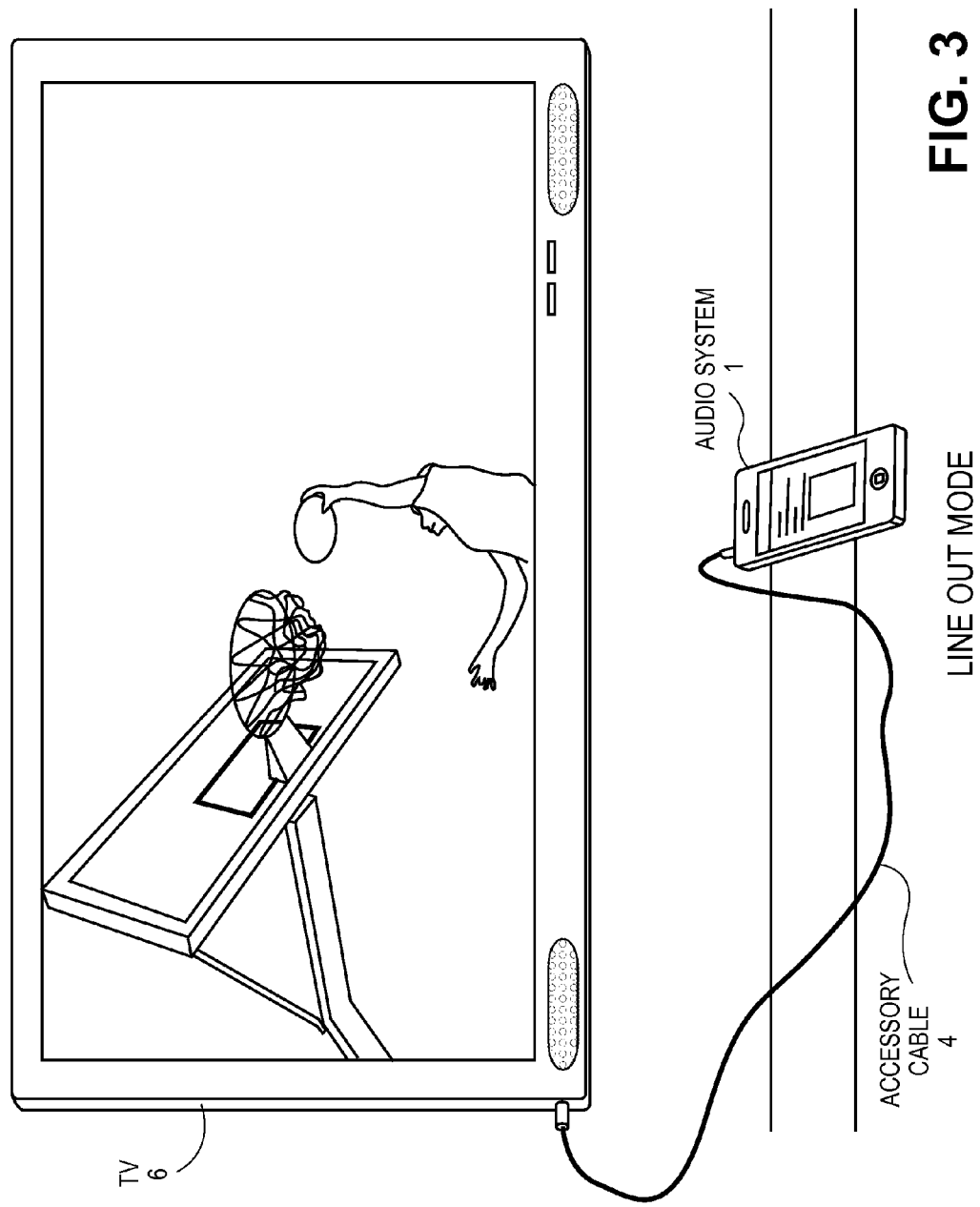
FIG. 3 shows the audio system in use in line out mode.

FIG. 2 shows the audio system 1 in use while in the line out mode. Here, the accessory cable 4 terminates at standalone speakers 5 which may be separately powered, rather than relying upon obtaining power from the audio system 1 through the accessory cable 4 (see FIG. 1 where the earphone and microphone are both powered by the audio system 1 through the accessory cable 4). Another example of line out mode is shown in FIG. 3 where the load that is attached to the accessory connector 7 is the line-in port of a television 6.

One difference between line out mode and headphone mode is the different output impedance presented on the signal pin of the connector 7, to the attached load. Typically, a directly powered earphone presents a substantially lower impedance than the audio amplifier input of a standalone speaker 5 or a television 6. The expected impedance seen by the audio system 1 looking into the accessory cable 4 may be on the order of less than 100 ohms when driving an earphone, while that impedance when driving the input port of a self-powered speaker 5 or television 6 may be on the order of between 1 kilo ohms and 20 kilo ohms. In addition, it has been found that in several instances of line out mode, the audio system 1 is faced with a substantially higher parasitic capacitance, that may be modeled as a shunt capacitance, as compared to the headphone mode. This larger shunt capacitance may cause an integrated power amplifier of an audio codec (which is driving the audio content into the accessory cable 4) to become unstable in line out mode. While it is possible to modify the power amplifier to enable it to drive higher capacitance loads, doing so presents a tradeoff against other design parameters that are relevant, including, in particular, an increase in power which for portable devices is difficult to accept.

Figure 4:
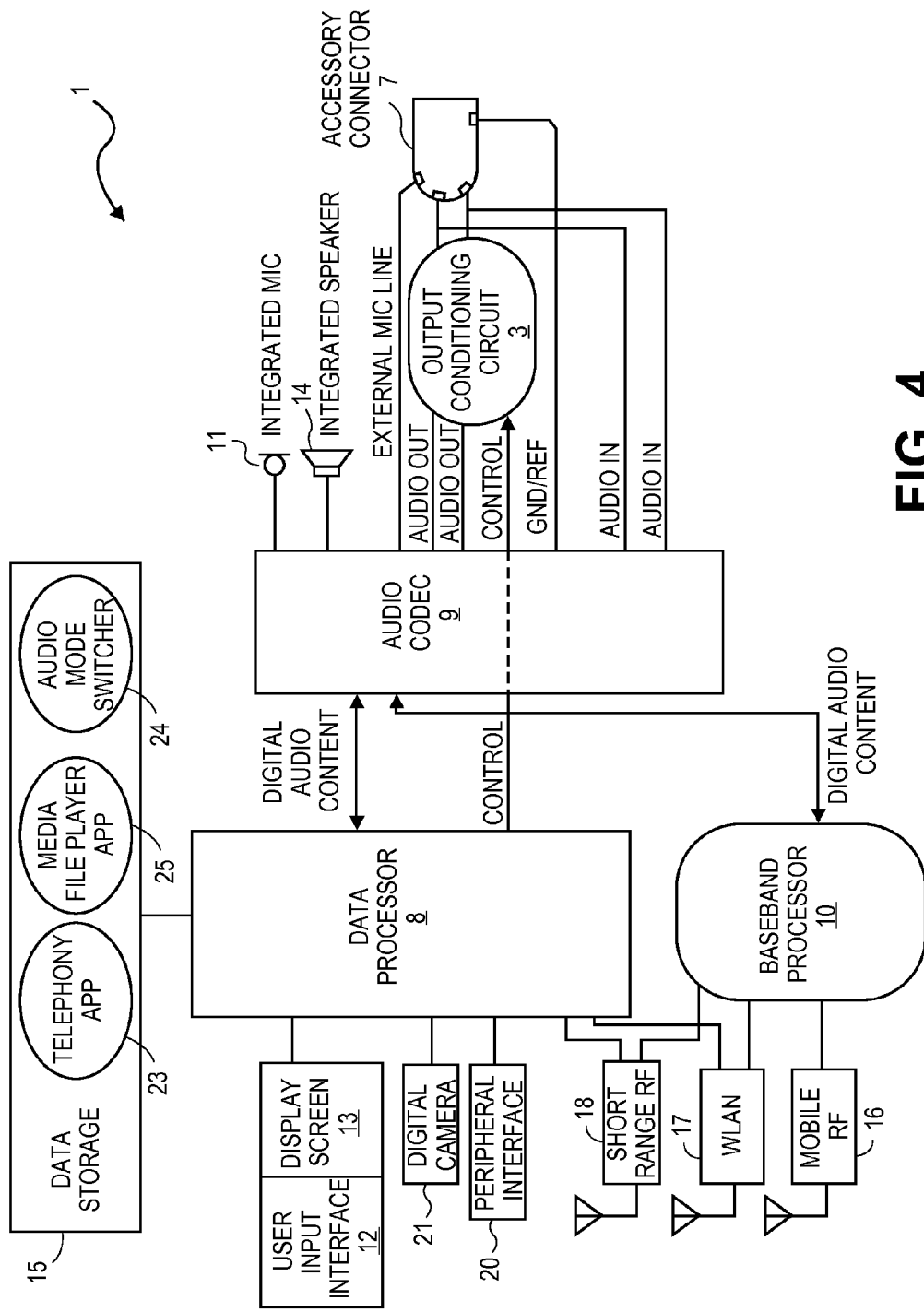
FIG. 4 is a combined block diagram and circuit schematic of relevant portions of a portable communications device, as an example of the audio system.

Before addressing the aspects of how to improve audio performance in both line out and headphone modes, a combined block diagram and circuit schematic of relevant portions of a portable communications device as an example of the audio system 1 is presented in FIG. 4. Being a portable device, the audio system 1 depicted in FIG. 4 is not only battery powered but also has several wireless communications interfaces, including a short range RF interface 18 (e.g., Bluetooth compatible), a wireless local area network interface 17 (also referred to as WiFi), and a mobile RF interface 16 (also referred to as a cellular terrestrial radio access network transceiver). A baseband processor 10 is responsible for digital encoding and decoding of communication content in the baseband or intermediate frequency band; such content may include audio content in the form of a downlink audio signal from a remote device (not shown) that may contain, for instance, the speech of a far-end user, and an uplink signal that may contain speech of a near-end user of the audio system 1. The audio system 1 depicted in FIG. 4 also includes other hardware such as a digital camera 21, and a local or peripheral interface 20 (e.g., a docking connector and associated circuitry, a universal serial bus interface). A display screen 13 is also provided, together with a user input interface 12. The latter may be in the form of a physical keyboard or keypad, although currently a touch panel together with the display screen 13 forming a touch screen is a popular alternative.

The various functions of the audio system 1 may be managed by a data processor 8, which in the case of a portable multi-function consumer electronic device may be an applications processor, a central processing unit, or a system on a chip (SoC). The term "data processor" is used generically here to refer to any suitable combination of data processing circuitry. The data processor 8 is programmed by instructions stored in data storage 15, depicted here as applications or modules including a telephony application 23 (to enable voice or video calls), and a media file player application 25 (to enable playback or streaming of digital audio and video files). The data storage 15 may be composed of non-volatile memory such as flash memory or a hard disk drive, in addition to random access memory. The data storage 15 may also have stored therein an audio mode switcher 24 which programs the processor 8 to select an audio output mode of operation, being one of line out mode and headphone mode. In so doing, the audio mode switcher 24 controls or configures an output conditioning circuit 3 in order to change output impedance that is presented at one or more signal pins of the accessory connector 7. This and other aspects of the various embodiments of the invention will be described next.

Audio output is achieved through the accessory connector 7, which may be integrated within the housing (not shown) of the audio system 1 together with the hardware components depicted in FIG. 4. The accessory connector 7 may be a headphone or earphone jack, such as a 4-pin TRRS connector. The four pins include an external microphone line pin, left and right speaker pins, and a ground or reference pin. Other pin assignments and jack styles are possible. In general, the connector 7 is designed to interface the audio system 1 with an external device, namely an accessory device such as a directly powered headset, or a standalone device such as a self-powered speaker or an audio receiver (amplifier).

The pins of the accessory connector 7 are coupled to an audio codec 9. The codec 9 is an integrated circuit having a digital to analog converter (DAC), an analog to digital converter (ADC), and an audio power amplifier. The audio codec 9 may be a single integrated circuit die that is separately packaged by itself or in combination with other circuitry, as an audio IC package. It has, in this case, at least two analog audio output pins labeled "audio out" that are driven by their respective power amplifiers, through an output conditioning circuit 3, before passing through the corresponding signal pins of the accessory connector 7. The audio content is driven by the audio codec 9 relative to the ground/reference pin of the connector 7. The audio content that is output by the codec 9 may be produced or routed by the data processor 8 (e.g., while playing a digital audio file under control of the media file player app 25), or the baseband processor 10 which may be decoding and delivering a downlink speech signal during a call. Codec 9 also has several input pins, including an external mic line input and, in this case, at least two separate audio input pins. The external microphone line allows the audio codec 9 to receive input audio content from an external device, e.g. speech of a near-end user, through the mic pin of the accessory connector 7.

Figure 5:
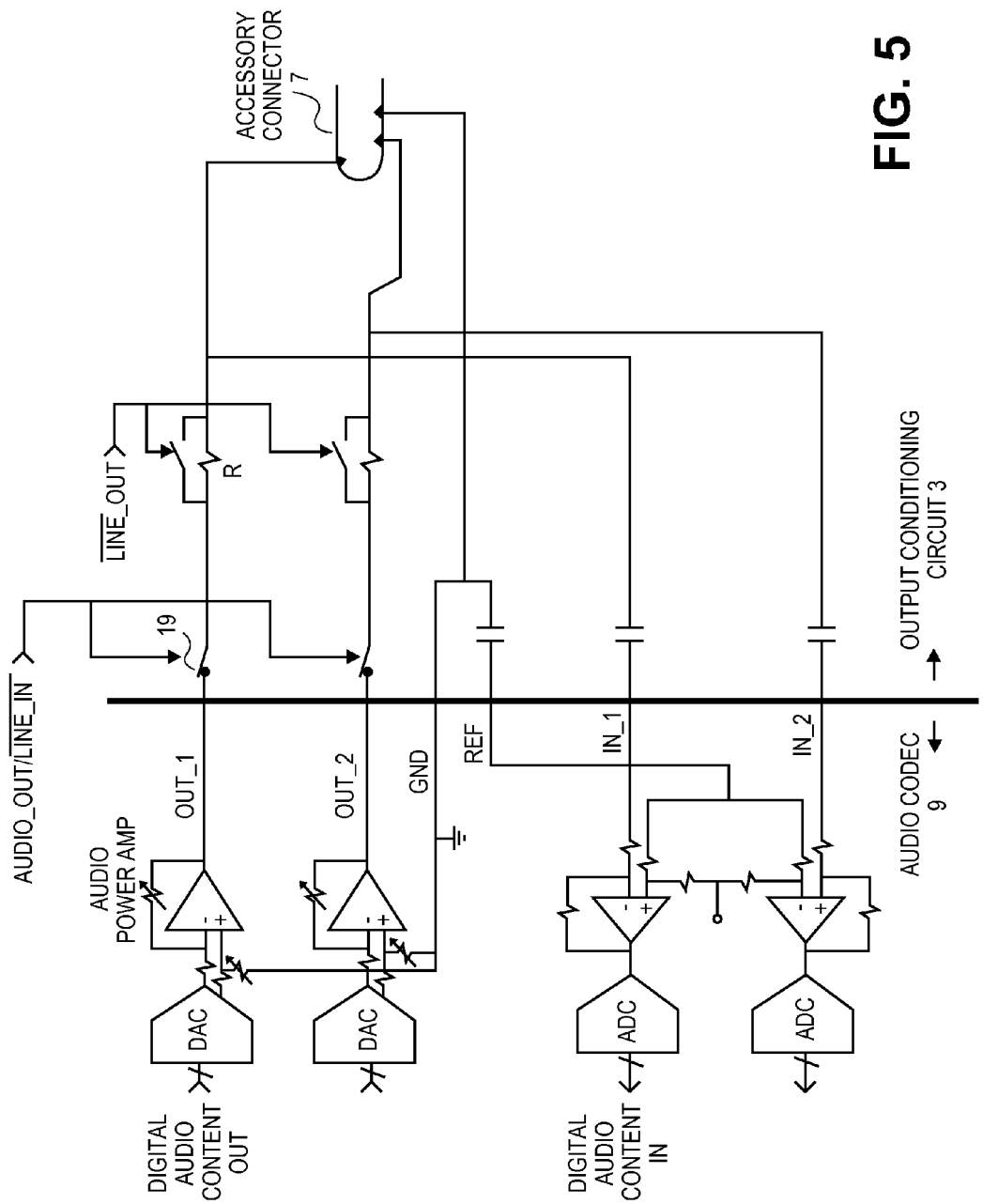
FIG. 5 is a circuit schematic of an example output conditioning circuit that is coupled between input and output pins of an audio codec on the one hand and signal and ground pins of an accessory connector on the other.

Turning now to FIG. 5, a circuit schematic of an example output conditioning circuit 3 (see FIG. 4) that is coupled between input and output pins of the audio codec 9 on the one hand, and signal and ground pins of the accessory connector 7 on the other, is shown. In this example, there are two audio output channels each having its own DAC, however, the principles described here are applicable to a single audio output channel. Digital audio content that is to be sent out of the codec 9 is converted by the DAC into analog format, and then driven by an audio power amplifier (e.g., a class AB amplifier); the power amplifier has variable gain to yield variable sound volume. The output pin out_1 of the audio codec 9 is coupled to a signal pin of the accessory connector 7, through a series-coupled resistor R. The latter may be a passive resistance element. In order to achieve variable output impedance at the signal pin of the accessory connector 7, the resistor R is to be switched in and out in accordance with a digital control signal LINE_OUT#/HP, under control of the data processor 8 (see FIG. 4). In the line out mode, the resistor R is switched in (by opening the switch in response to LINE_OUT#), to increase the output impedance. In the headphone mode, the resistor R is switched out (by closing the switch thereby shorting out the resistor R, in response to HP), to thereby decrease the output impedance. Changing the output impedance in this manner allows the audio system 1 to more efficiently drive the load that is attached to the accessory connector 7.

The audio codec 9 also has digital audio content input pins in_1, in_2. The input pins in_1, in_2 may be AC coupled to the signal pins of the accessory connector 7 as shown. After passing through a preamplifier, the analog audio input signals are converted into digital form by the ADCs. The input digital audio content can now be read by the data processor 8 to monitor the voltage on the signal pin of the accessory connector 7.

The arrangement in FIG. 5 may be used for the following purposes. First, a self-test of the audio output capability (of the audio system 1) may be performed, either during high volume manufacturing test of the audio system 1, or subsequently in the field. To do so, a self-test routine (not shown) may be written and then stored in the data storage 15, which programs the processor 8 to read output of the ADC, and compare this to a known digital signal that is being concurrently driven into the signal pin by the power amplifier.

Such a self-test may be conducted while the switch 19 is closed (see FIG. 5), so that a known signal can be driven onto the monitored signal pin by one of the audio channels out_1 or out_2. When comparing the monitored voltage to the known digital content that is being driven by the power amplifier, the following factors should also be taken into account: the conversion response of the DAC in terms of output amplitude, the voltage gain exhibited by the power amplifier at the given volume setting, and the value of the series-coupled resistor R together with whether or not it is switched in or out. An application of Ohm's law will then reveal the calculated, instantaneous current that is being driven through the signal pin of the accessory connector 7. This calculated output current can then be compared to a predefined range that has been determined to be the capability of the output audio channel. If the calculated output current is outside of the predefined range, then the programmed processor may indicate, for instance through an alert to the user, that proper audio cannot be produced through the external device that is currently attached to the connector 7.

The arrangement in FIG. 5 can also be used to for fault detection, to determine whether or not a predetermined fault condition exists on the signal pin of the connector 7. If so, then the volume can be reduced or entirely muted, and an alert can be signaled to a user of the audio system 1 that a fault condition has been discovered. That would be the case if the processed ADC reading indicates that the signal pin of the accessory connector 7 is, for example, shorted or has extremely low impedance. It should be expected that when there is essentially a short circuit on the signal pin due to, for instance, a failure of the connector 7 or a failure at some point further downstream such as at the attached earphone or external audio amplifier, there will be essentially zero voltage measured on the signal pin through the in_1 or in_2 pin. Assuming that there is some digital audio content that is being driven by the power amplifier, and the volume setting is not at absolute minimum, then unless the signal pin is essentially shorted, there will be a measureable amount of voltage on the signal pin which can be read through the ADC by the programmed processor 8; otherwise, the programmed processor 8 should indicate that there is a fault condition on the connector 7.

The arrangement in FIG. 5 may also be used to determine the type of external device that is attached to the connector 7, and on that basis make a selection of the audio output mode of operation. This may be based on the programmed processor 8 making an impedance measurement on the signal pin of the connector 7. There may be several different impedance ranges that have been defined in advance, based on the expected load that would be attached to the accessory connector 7. A "high" range may be defined as between approximately 1 k ohms-20 k ohms (e.g., the input impedance range of a typical audio receiver or amplifier) and a "low" range that is between 2 ohms and 100 ohms (which is typical of a directly powered headphone or earphone). As suggested above, the impedance seen looking out of the signal pin may be calculated by simply using Ohm's law as a ratio of measured voltage on the signal and the current that is being driven through the series resistor R. The latter can be computed based on taking the difference between what is known to be driven by the power amplifier and the detected voltage on the signal pin, with the understanding, of course, that the effect of the DAC conversion and the current volume setting of the power amplifier is to be taken into account (e.g., as a scaling factor that is applied to the digital audio content being provided to the input of the DAC). Once the impedance characteristics have been determined in this manner, the audio output mode of operation may be selected based on the following: if the detected impedance is low, then the selected output mode is headphone mode and the output conditioning circuit 3 (see FIG. 5) is configured with a low output impedance (by shorting out the series-coupled resistor R); if the detected impedance is high, then the selected mode of operation is line-out which configures the output conditioning circuit with a high output impedance (by switching in the resistor R).

For smoother switching between the two modes of operation, and to reduce the risk of producing acoustic pops that are annoying to the user, the data storage 15 may contain further stored instructions (as part of the audio mode switcher 24) which program the processor 8 to read output of the ADC, process the reading to detect a zero crossing, and control the conditioning circuit 3 so that the output impedance is changed concurrent with the detected zero crossing.

A method for operating the audio system 1 may be as follows. The method may begin with driving audio content at a given user-selected volume setting, through a signal pin of the accessory connector 7 and at a particular output impedance (e.g., the resistor R is switched in) While the audio content is being driven out through the signal pin, feedback from the signal pin is measured (by the programmed processor reading and monitoring the output of the ADC whose input is coupled to the signal pin). This measurement may be a calculation by the processor 8, such as signal energy over a given interval, or peak to peak audio level during the given interval. The processor may then compare this measured feedback with a similar measure of the known digital audio content that is being driven, taking into consideration the given volume setting (e.g., by scaling the digital audio content according to the given volume setting). It then calculates, based on the measured feedback and known content, an impedance characteristic of the signal pin (e.g., failing within one of several predefined ranges, such as essentially shorted, low impedance, high impedance, and essentially open circuit).

Next, but before changing to a different output impedance, the volume is lowered. Then, while the volume remains low, the output impedance is changed based on the calculated impedance characteristic, and then the volume is raised back to its original level. All the while, the audio content may continue to be driven through the signal pin, most recently at the different output impedance.

Note that the initial driving of audio content through the connector may in response to detecting that an external device has been attached to the accessory connector. Also, the audio content may be a downlink communications speech signal, and wherein prior to detecting that an accessory connector has been attached, the audio content in the downlink speech communications signal was being routed to either an earpiece speaker or a speakerphone.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the audio system 1 depicted in the figures may be a smart phone, digital media player, or a tablet computer, the audio system may alternatively have be a different portable device such as a laptop computer, or even a non-portable device such as a desktop computer or a home entertainment appliance (e.g., digital media receiver, media extender, media streamer, digital media hub, digital media adapter, or digital media renderer). The description is thus to be regarded as illustrative instead of limiting.

What is claimed is:

1. An audio system comprising:
   a connector having a signal pin to interface the audio system with an external device;
   an audio integrated circuit having a digital to analog converter (DAC), an audio power amplifier having an input coupled to an output of the DAC and an output coupled to an output pin of the audio integrated circuit;
   a processor;
   data storage containing stored instructions that program the processor to select an audio output mode of operation being one of line mode and headphone mode; and
   a configurable output conditioning circuit coupled between the output pin of the audio integrated circuit and the signal pin of the connector, the conditioning circuit to change output impedance presented at the signal pin, under control of the programmed processor when selecting the audio output mode of operation, wherein the audio integrated circuit further comprises an analog to digital converter (ADC) having an input coupled to an input pin of the audio integrated circuit, the input pin of the audio integrated circuit being coupled to the signal pin of the connector,
   and wherein the data storage contains further stored instructions which program the processor to read output of the ADC, to process the ADC output reading to determine which type of external device is attached to the connector, by comparing said reading to concurrent digital content that is input to the DAC, wherein the comparison is also based on concurrent volume level, and on that basis control the configurable output conditioning circuit when selecting the audio output mode of operation.

2. A portable audio system comprising:
   a handheld portable audio device, wherein the device has a housing in which are installed:
      an accessory connector to interface the portable audio device with an external device,
      an audio codec having a digital to analog converter (DAC), an audio power amplifier having an input coupled to an output of the DAC and an output coupled to a signal pin of the connector, and an analog to digital converter (ADC) having an input coupled to the signal pin of the connector,
      a processor,
      an output conditioning circuit coupled between the output pin of the codec and the signal pin of the connector, and data storage containing stored instructions that program the processor to read output of the ADC while known digital content is fed to the DAC, compare the reading to the known digital content and on that basis determine whether or not to signal a fault condition, and reduce or mute an output volume when a fault condition is present.

3. The portable audio system of claim 2 wherein the output conditioning circuit is configurable to change output impedance presented at the signal pin, under control of the programmed processor when switching between first and second audio output modes of operation.

4. The portable audio system of claim 3 wherein the programmed processor is to calculate impedance characteristics at the signal pin of the connector based on (i) reading output of the ADC while known digital content is fed to the DAC, (ii) current volume setting, and (iii) value of a series resistor in the output conditioning circuit, and wherein the process is to switch between the first and second audio output modes of operations based on the calculated impedance characteristics.

5. A method for operating an audio system, comprising:
driving audio content through a signal pin of an accessory connector, at a first volume setting and at a first output impedance;
measuring feedback from the signal pin while driving the audio content through the signal pin;
comparing the measured feedback with the audio content, based on the first volume setting;
determining, based on comparing the measured feedback with the audio content, an impedance characteristic of the signal pin;
based on the determined impedance characteristic, changing to a second output impedance;
wherein before changing to the second output impedance and based on the determined impedance characteristic, changing to a second, lower volume setting; and then
raising volume while driving the audio content through the signal pin at the second output impedance.

6. The method of claim 5 wherein the driving of audio content through the connector is in response to detecting that an external device has been attached to the accessory connector.

7. The method of claim 5 wherein the audio content is in a downlink speech communications signal.

8. The method of claim 7 wherein prior to detecting that an accessory connector has been attached, the audio content in the downlink speech communications signal was being routed to one of an earpiece speaker and a speakerphone.

9. The audio system of claim 1 wherein the configurable output conditioning circuit includes a passive resistor that is series-coupled between the output pin of the audio integrated circuit and the signal pin of the connector, the resistor to be switched in and out under control of the programmed processor when selecting the audio output mode of operation, wherein in the line mode the passive resistor is switched in to increase the output impedance, and in the headphone mode the passive resistor is switched out to decrease the output impedance.

10. The audio system of claim 9 wherein the data storage contains further stored instructions which program the processor to read output of the ADC, process the reading to detect a zero crossing, and control the conditioning circuit so that the resistor is switched in or out concurrent with the detected zero crossing.

11. The audio system of claim 9 having a first state in which the processor determines the type of external device as being a headset and selects the headphone mode of operation which in turn configures the output conditioning circuit with a low output impedance at the signal pin of the connector,
and a second state in which the processor determines the type of external device as being an audio receiver and selects the line mode of operation which in turn configures the output conditioning circuit with a high output impedance at the signal pin of the connector.

12. The audio system of claim 9 wherein the data storage contains further stored instructions which program the processor to read output of the ADC, process the reading to determine whether or not a fault condition exists on the signal pin of the connector, and on that basis one of control the power amplifier and signal an alert to a user of the system.

13. The audio system of claim 9 wherein the data storage contains further stored instructions which program the processor to read output of the ADC, process the reading as part of a self-test routine to determine whether or not the audio integrated circuit is capable of producing audio through the signal pin of the connector.

14. The audio system of claim 9 further comprising a switch that is series-coupled between the output of the power amplifier and the signal pin of the connector.

15. The audio system of claim 14 wherein the data storage contains further stored instructions which program the processor to open the switch upon selection of an analog line-in mode of operation in which the processor reads the ADC.

16. The audio system of claim 9 wherein the data storage contains further stored instructions which program the processor to read output of the ADC, process the reading to determine impedance characteristics on the signal pin and on that basis adjust an audio equalization parameter that affects spectral characteristics of audio content that is concurrently being fed to the DAC.

* * * * *